Oct. 5, 1943.　　　J. G. JACKSON　　　2,330,975
ENCLOSURE FOR ELECTRICAL DEVICES
Filed Nov. 20, 1940
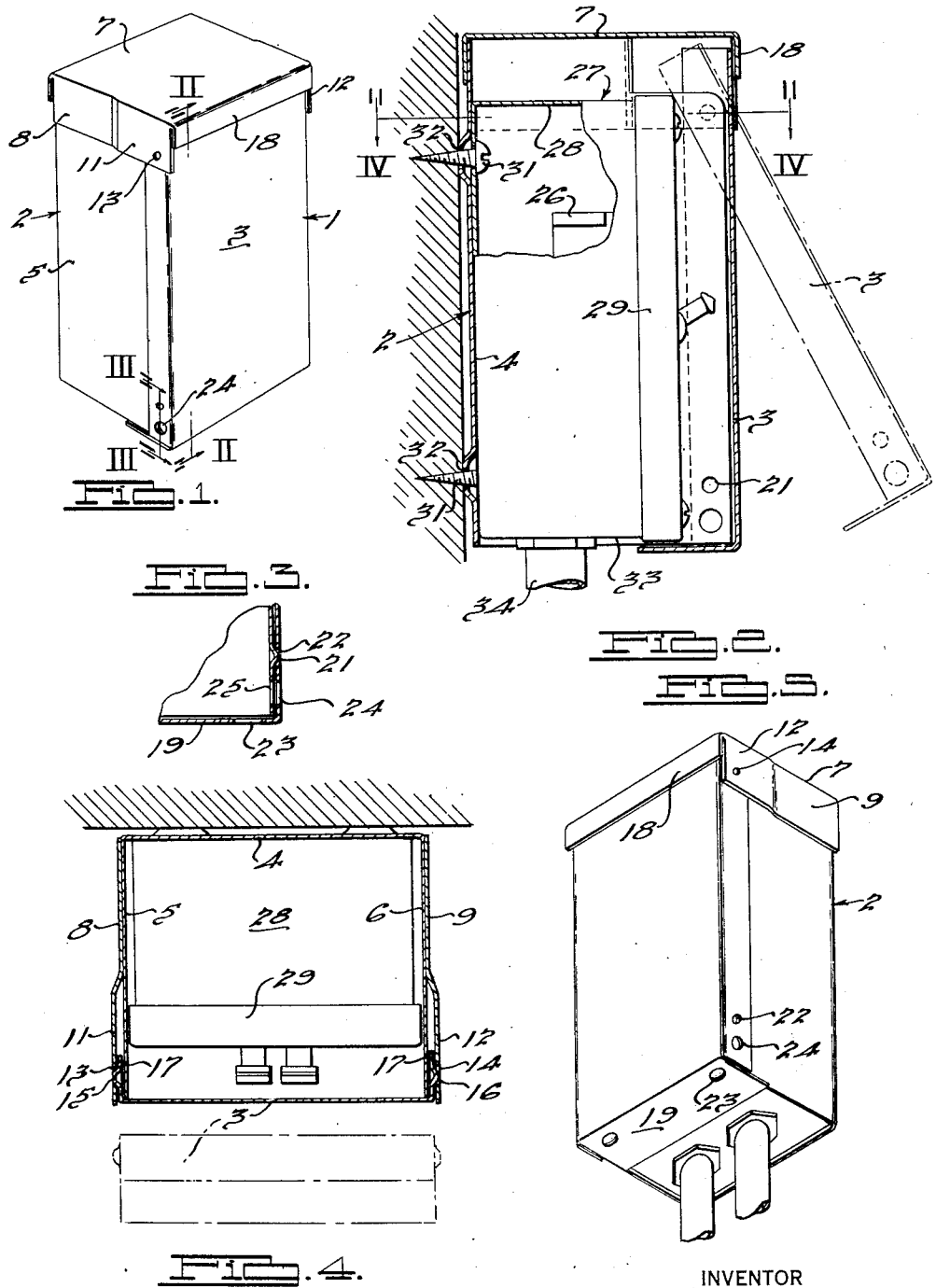
INVENTOR
John G. Jackson.
BY
ATTORNEY Patented Oct. 5, 1943

2,330,975

UNITED STATES PATENT OFFICE 2,330,975

ENCLOSURE FOR ELECTRICAL DEVICES

John G. Jackson, Detroit, Mich., assignor to Square D Company, Detroit, Mich., a corporation of Michigan Application November 20, 1940, Serial No. 366,361

8 Claims. (Cl. 174—52)

This invention relates to enclosures for receiving electrical instrumentalities and has for an object the provision of enclosing means adapted to protect electrical instrumentalities from the elements.

Another object of the present invention is the provision of an improved, simple and economical form of enclosure.

Another object of the present invention is to provide an open bottomed cabinet adapted to receive a second cabinet having an electrical instrumentality enclosed therein.

Another object of the present invention is to provide raintight enclosing means for an electrical instrumentality and in which the instrumentality is readily accessible for wiring.

Other objects and features of this invention will be readily apparent to those skilled in the art from the following specification and appended drawing illustrating certain preferred embodiments of the invention in which:

Figure 1 is a perspective view of the outer enclosure according to the present invention.

Figure 2 is a sectional view taken on the line II—II of Figure 1 and showing the cover in dotted outline in open position.

Figure 3 is a partial sectional view taken on the line III—III of Figure 1.

Figure 4 is a sectional view taken on the line IV—IV of Figure 2.

Figure 5 is a perspective view of the outer enclosure but with the electrical instrumentality and its enclosing box mounted therein.

The enclosure 1 according to the present invention embodies a cabinet 2 and an upwardly swingable door 3 mounted thereon. The cabinet portion 2 is formed from a U-shaped stamping having a back wall 4 and side walls 5 and 6. The cabinet portion 2 is completed by a flanged top wall or cap 7 rigidly secured to the walls 4, 5, and 6 as by welding. The cabinet has no bottom wall, the reason for which will be hereinafter explained. The cap 7 comprises side flanges 8 and 9, a portion of each of which is bent as at 11 and 12 to lie spaced from the side walls 5 and 6 of the cabinet 2 as is seen in Figure 4. Openings 13 and 14 are provided through portions 11 and 12 of the flanges 8 and 9 to receive pressed out projections 15 and 16 provided by opposite side flanges 17 of cover 3 to thereby pivotally mount the cover to the cabinet portion 2. Mounting the door 3 in the manner described provides not only a secure pivotal mounting for the door but also permits the manual removal of the door to more easily mount an electrical instrumentality within the cabinet 2. The top edge of the cover 3 is received within the front flange 18 of cap 7 with the side flanges 17 of the cover embracing the side walls 5 and 6 but having the upper portions thereof disposed within the flanges 8 and 9 of the cap. Also provided on the cover 3 is a rearwardly directed bottom flange 19 adapted to embrace a portion of the bottom edges of the side walls 5 and 6.

Disposed near the bottom of the side walls 5 and 6 and near the front edges are pressed out projections 21 adapted to be forced into openings 22 provided by cover flanges 17 upon manual movement of the cover 3 to its closed position to thereby latch the cover in position.

To retain the cover 3 in its closed position, openings are provided in enclosure 1 for the reception of padlocks therethrough, these openings comprising openings 23 in the bottom flange 19 of cover 3, and openings 24 in side flanges 17 of the cover which align with openings 25 provided in the side walls 5 and 6 in the closed position of the cover.

The enclosure 1 is adapted to receive therein an electric circuit controlling device or other instrumentality 26 together with its enclosure 27 comprising a box 28 and a cover 29. The box 28 carries studs 31 which pass through openings 32 in the back wall 4 of cabinet 2 to secure both the cabinet 2 and the box 28 to a support. The cabinet 2 does not have a bottom wall formed therewith for the enclosure 27 is so disposed within cabinet 2 that its bottom wall 33 closes this opening in cabinet 2. With this arrangement conduits 34 may be secured directly to enclosure 27 and with door 3 being readily manually removable, it is seen that the present construction makes for ease in the wiring of the electrical device 26.

It is apparent the flanging and overlapping construction of cap 7 and cover 3 with cabinet 2 and the provision for the reception of a completely enclosed box for the electrical device 26 results in an economical raintight structure with the additional advantage that because enclosure 1 can receive a second enclosure therein standard electrical devices of a variety of ratings may be readily received and supported.

While certain preferred embodiments of the invention have been specifically disclosed, it is understood that the invention is not limited thereto and is to be given its broadest possible interpretation within the terms of the following claims.

What is claimed is:

1. Enclosing means for an electrical instrumentality comprising an outer enclosing member open at one end and at the front thereof, an enclosing box disposed within said outer member, a portion of said enclosing box closing the open end of said outer member, an openable cover for said enclosing box, a cover to close said front of said outer member, and means whereby said latter cover is pivotally and releasably mounted on said outer member, said cover being manually removable by pulling thereon to provide ready access to said enclosing box and to the cover thereof.

2. Enclosing means for an electrical instrumentality comprising a generally U-shaped member, means closing one end thereof, an enclosing box disposed within the space defined by the legs of said U-shaped member, an openable cover for said enclosing box, a cover pivotally mounted on said U-shaped member and being detachable therefrom to provide ready access to said enclosing box and to the cover thereon, means on said enclosing box for the attachment of conduit thereto, said means being supported on the end of said enclosing box adjacent the opposite open end of said U-shaped member whereby said means are directly accessible from the exterior of the enclosing means.

3. Enclosing means for an electrical instrumentality comprising a generally U-shaped member, flanged means closing the upper end thereof, an enclosing box disposed within the space defined by the legs of said U-shaped member and having an end thereof located adjacent the lower end of the U-shaped member, means carried by said enclosing box mounting said box in position within said U-shaped member, an openable cover for said enclosing box, a cover for said U-shaped member to close the front opening thereof, said cover being pivotally mounted on said flanged means, and means for the attachment of conduit provided at the end of said enclosing box adjacent the lower end of the U-shaped member whereby said means are directly accessible through said lower end.

4. Enclosing means for an electrical instrumentality comprising an outer enclosure open at the bottom and at the front thereof, an enclosing box disposed within said outer enclosure, a portion of said enclosing box closing the bottom of said outer enclosure, an openable cover for said enclosing box, a cover for said outer enclosure, means for effecting a releasable and pivotal mounting of said cover on said outer enclosure, said cover being manually removable by pulling thereon to provide ready access to said enclosing box, conduit attachment means provided on said portion of the enclosing box closing the bottom of the outer enclosure, whereby said means are directly accessible from the exterior of the enclosing means, and means carried by said enclosing box for mounting it in position within the outer enclosure and for securing said outer enclosure to a support.

5. Enclosing means for an electrical instrumentality comprising a generally U-shaped member, a member closing the top thereof and having a flange disposed on either side of the U-shaped member adjacent the opposite legs thereof with at least a portion of each of said flanges being spaced from said legs, an enclosing box disposed within the space defined by the legs of the U-shaped member, and having a portion thereof provided adjacent the bottom open end of said U-shaped member, means on said portion of said enclosing box for the attachment of conduit, said means being directly accessible from the exterior of the enclosing means, a cover for said U-shaped member and with a portion thereof being receivable within the space provided between said flanges and said legs adjacent, said cover being releasably and pivotally mounted on one pair of said elements and being manually removable therefrom by pulling thereon to provide ready access to the enclosing box, and means carried by said enclosing box for mounting it in position within said U-shaped member, said means also securing said U-shaped member to a support.

6. Enclosing means for an electrical instrumentality comprising two enclosures, one disposed within the other, said outer enclosure having an end and the front thereof open, said inner enclosure having an end thereof located adjacent said open end to close the same, means for the attachment of conduit provided on said end of the inner enclosure to be directly accessible from the exterior of the enclosing means, and a cover pivotally and releasably secured to said outer enclosure, said cover being readily manually detachable therefrom by pulling thereon to permit ease of access to said inner enclosure.

7. Enclosing means for an electrical instrumentality comprising a generally U-shaped member, a member closing an end thereof and having a flange disposed on either side of and adjacent the opposite legs of the U-shaped member with at least a portion of each of said flanges being spaced from said legs, an enclosing box disposed within said U-shaped member and having a portion thereof closing the other end of said U-shaped member, an openable cover for said enclosing box, said spaced flange portions having openings therethrough, a cover for closing the front of said U-shaped member, a plurality of projections on said cover, said projections being receivable by said openings to pivotally and releasably mount said cover to said flanged member, said cover being readily detachable by a simple pulling movement to effect ready access to said enclosure box.

8. Enclosing means for an electrical instrumentality comprising a generally U-shaped member, a member closing an end thereof and having a flange disposed on either side of and adjacent the opposite legs of the U-shaped member with at least a portion of each of said flanges being spaced from said legs, an enclosing box disposed within said U-shaped member and having a portion thereof closing the other end of said U-shaped member, an openable cover for said enclosing box, said spaced flange portions having openings therethrough, a cover for closing the front of said U-shaped member, a plurality of projections on said cover, said projections being receivable by said openings to pivotally and releasably mount said cover to said flanged member, said cover being readily detachable by a simple pulling movement to effect ready access to said enclosing box, conduit attaching means provided on said closing portion of said enclosing box and readily accessible from the exterior of the enclosing means and means carried by said enclosing box for mounting said box in position within said U-shaped member, said mounting means also securing said U-shaped member to a support.

JOHN G. JACKSON.